United States Patent [19]

Zorin et al.

[11] Patent Number: 5,999,660
[45] Date of Patent: Dec. 7, 1999

[54] IMAGING SYSTEM FOR CORRECTION OF PERCEPTUAL DISTORTION IN WIDE ANGLE IMAGES

[75] Inventors: Denis Zorin; Alan H. Barr, both of Pasadena, Calif.

[73] Assignee: California Institute of Technology, Pasadena, Calif.

[21] Appl. No.: 08/506,764

[22] Filed: Jul. 26, 1995

[51] Int. Cl.[6] .................................................. G06K 9/64
[52] U.S. Cl. ........................................ 382/276; 382/154
[58] Field of Search .................................... 382/293, 285, 382/275, 154, 276; 395/118, 119, 125, 127

[56] References Cited

U.S. PATENT DOCUMENTS

| | | | |
|---|---|---|---|
| 4,412,726 | 11/1983 | Horimoto | 350/461 |
| 4,464,029 | 8/1984 | Jaulmes | 352/69 |
| 4,647,161 | 3/1987 | Müller | 350/462 |
| 5,175,808 | 12/1992 | Sayre | 382/293 |
| 5,214,511 | 5/1993 | Tanaka | 382/285 |
| 5,528,194 | 6/1996 | Ohtani et al. | 382/293 |
| 5,539,868 | 7/1996 | Hosoya et al. | 395/151 |
| 5,561,723 | 10/1996 | Des Jardins et al. | 382/285 |
| 5,581,665 | 12/1996 | Sugiura et al. | 382/154 |
| 5,592,599 | 1/1997 | Lindholm | 395/127 |

OTHER PUBLICATIONS

Michael Potmesil et al., "Synthetic Image Generation with a Lens and Aperture Camera Model", ACM Transactions on Graphics, vol. 1, No. 2, Apr. 1982, pp. 85–108.

Jack Tumblin et al., "Tone Reproduction for Realistic Images", IEEE Computer Graphics & Applications, Nov., 1993, pp. 42–48.

Leonardo da Vinci, "The Notebook of Leonardo da Vinci", Reynel & Hitchcock, New York, 1938, pp. 370–373.

E. H. Blake, "The Natural Flow of Perspective: Reformulating Perspective Projection for Computer Animation", ISAST, 1990, Pergamon Press, pp. 401–409.

Margaret A. Hagen, "Influence of Picture Surface and Station Point on the Ability to Compensate for Oblique View in Pictorial Perception", Developmental Psychology, 1976, vol. 12, No. 1, pp. 57–63.

Michael Gleicher et al., "Through–the–Lens Camera Control", Computer Graphics, 26, Jul. 2, 1992, pp. 331–340.

Margaret A. Hagen et al., "A Distinctive Characteristic of Pictorial Perception: The Zoom Effect", Perception, 1978, vol. 7, pp. 625–633.

Horacio C. Reggini, "Perspective Using Curved Projection Rays and its Computer Application", Leonardo, vol. 8, Pergamon Press, 1975, pp. 307–312.

Primary Examiner—Yon J. Couso
Attorney, Agent, or Firm—Fish & Richardson P.C.

[57] ABSTRACT

An imaging system which corrects perceptual distortion in wide angle picture balances between direct view distortion and linear perspective distortion. The two kinds of distortion are balanced according to a transformation ratio. The balancing can be expressed as:

$$\rho(r) = \lambda \frac{r}{R} + (1-\lambda) \frac{R\left(\sqrt{r^2+1}-1\right)}{r\left(\sqrt{R^2+1}-1\right)}$$

and $\phi = \varnothing$ where $\rho$ and $\phi$ are the transformed polar coordinates corresponding to the original polar coordinates r and $\varnothing$, $\lambda$ is the transformation ratio defining the amount of each transform to be used, and R is the size of the new image. This can also be effected by a lens having the transfer characteristic whereby $B = \tan \beta / K$; where K is between 1 and 2.

17 Claims, 7 Drawing Sheets

$TAN\ \beta/2 \leq \rho \leq TAN\ \beta$

IMAGING SYSTEM FOR CORRECTION OF PERCEPTUAL DISTORTION IN WIDE ANGLE IMAGES

ORIGIN OF INVENTION

The government may have certain rights to this invention under NSF grant number ASC 892019.

FIELD OF THE INVENTION

The present invention describes a system for correcting perceptual distortion in an image of a three-dimensional object, especially a wide angle image. More specifically, the present invention defines a correction system formed by an image-changing object such as a processor or a lens, which corrects for distortion in a wide angle image.

BACKGROUND AND SUMMARY OF THE INVENTION

Cameras operate by converting light reflected from a three dimensional object into a two dimensional image. The conversion between different numbers of dimensions uses a "projection" to transform between the multiple dimensions. Conceptually, camera-type devices, including lens-operated cameras, CCD arrays, and photosensitive elements and the like, all operate in the same way.

Figure 1:
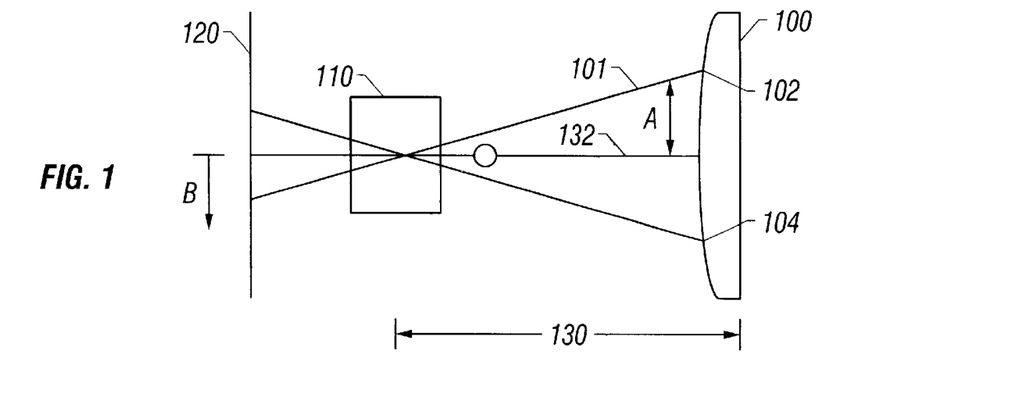
FIG. 1 shows a schematic of operation of a normal lens system.

FIG. 1 shows an object 100 producing light reflections 101 input to a lens system 110. The angle θ of the lens limits the amount of the object 100 which can be seen at one time. This angle Θ, therefore, defines the maximum amount of the object which can be imaged. Therefore, for lens 110 with angle θ, the part of the object between area 102 and 104 can be simultaneously imaged. A wider angle lens can image more of the object.

The rays of light are focused by the lens 110 onto an image receiving surface 120, which in a camera is embodied by a photoplate.

The lens can alter the light in various ways for various conditions. A conventional pinhole camera allows a single ray of light from each point on the object to impinge therethrough. Therefore, light from the point A on the object 100 is received at point B on the image receiving surface 120. If the object 100 is at the focal length distance 130 from the lens 110, then the dimension B can be related to the dimension A by any desired transformation amount, where the axis 132 is the central axis of the device. For example, lenses are known wherein B=A; B=sin A, B=Fourier transform (A) and other relations.

The inventors, however, recognized that linear perspective images may become distorted, especially as the angle of the lens increases. For a 180° lens, the photoplate would need to become theoretically infinite. Techniques such as "fisheye lens", described in U.S. Pat. Nos. 4,412,726; 4,647,161; 4,464,029 are used to avoid the necessity for an infinite photoplate.

Figure 1A:
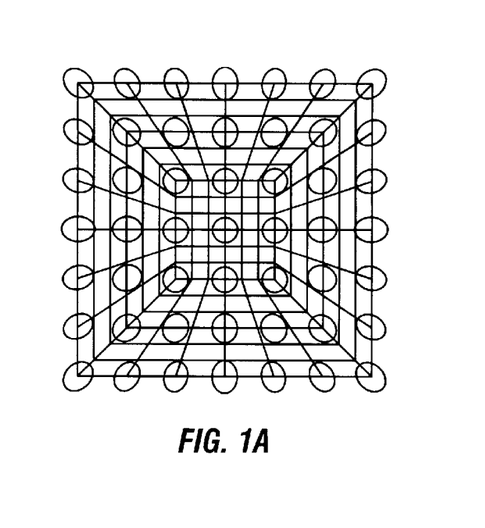
FIGS. 1A and 1B show linear perspective and direct view transformations.
Figure 1B:
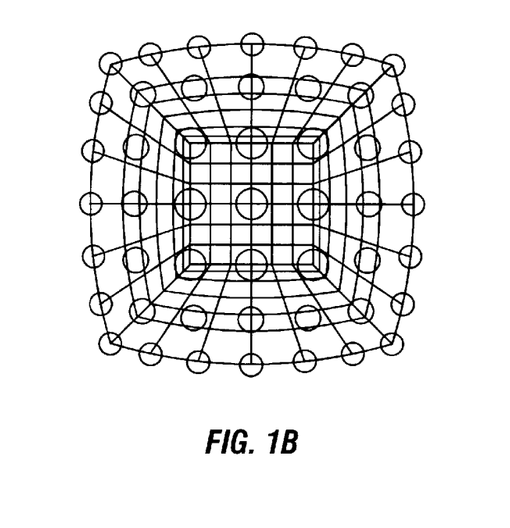

FIG. 1A shows a direct view transformation of a scene, and FIG. 1B shows a linear perspective view of that scene. Notice how the circles/spheres in FIG. 1A have become distorted in FIG. 1B. The straight lines in FIG. 1B, however, have become curved in FIG. 1A.

It is known that we can apply a conformal or angle-preserving transformation to an image, in a way that preserves the amount of direct view distortion. The curvature distortion can be further reduced by choosing an appropriate conformal transformation T and interpolating between T(DP(r)) and r.

It is an object of the present invention to correct for the geometric perceptual distortion which occurs in such pictures. This is done according to a first aspect of the present invention by transforming the images using a tradeoff between two competing transforms, to maximize the amount of distortion compensation. This can be done either via an optical correction mechanism or by an electronic correction.

BRIEF DESCRIPTION OF THE DRAWINGS

These and other aspects of the invention will now be described in detail with reference to the accompanying drawings, wherein.

DESCRIPTION OF THE PREFERRED EMBODIMENT

In order to describe the preferred embodiment, we must first consider the basis from which the present inventors realized the concepts of the present invention. Realistic image synthesis is based on modelling the physics of light propagations into three dimensional environments. The geometry of the three dimensional space must be projected onto the picture plane. The inventors realized that this transformation can cause distortion, especially when linear perspective is used.

The inventors of the present invention also noticed that distortions which occur in images can be classified as one of two main types:

I. Zero Curvature Condition—straight lines in the object space should be represented by straight lines in the image. The first kind of distortion changes the shape of straight lines.

II. Direct View Condition—All objects should look as if we were looking directly at them. The three dimensional object which we know as a sphere should look like a circle when we are looking directly at its two-dimensional rendering. The direct view distortion changes the look of a circle.

The inventors have determined a technique for obviating this problem. First, a brief description of the analysis.

Theoretically, a proper two dimensional image will produce the same image on the retina of an eye that the actual object would have produced. Assume a plane in the path between the object and the eye. Paint each point on that plane with the color of the ray of light going into the plane. When the eye then looks at the image on that plane, it should ideally see an image which coincides precisely with the image that it would have seen looking at the object. This only works, however, if the observer is looking only with one eye, or is far enough away that both eyes receive the same image. The user must also be far enough away such that looking at the picture, the position of the eye coincides with the position of the eye or camera. This is where the distinctions between real objects and pictures begin to become more apparent. We can look at a picture from various distances and directions with both eyes without our perception of the image changing at all. While almost all cameras use linear perspective, the inventors found that deviations from linear perspective can improve the look of an image.

The inventors have found that the direct view condition and zero curvature conditions cannot both be exactly satisfied simultaneously. Accordingly, according to the present invention, a technique is established for devising a tradeoff between the two types of distortions. The structure defined according to the present invention obviates this problem by defining a tradeoff between the two. The inventors have found that the zero curvature condition can be satisfied by the transformation:

$$\rho(r) = r/R$$

The direct view condition can be satisfied by:

$$\rho(r) = \frac{R\left(\sqrt{r^2+1}-1\right)}{r\left(\sqrt{R^2+1}-1\right)}$$

The inventors prefer to blend these two equations into the following transformations:
and $\phi = \emptyset$.

$$\rho(r) = \lambda \frac{r}{R} + (1-\lambda)\frac{R\left(\sqrt{r^2+1}-1\right)}{r\left(\sqrt{R^2+1}-1\right)}$$

Where $\rho$ and $\phi$ are the transformed polar coordinates corresponding to the original polar coordinates r and ø, $\lambda$ is the transformation ratio defining the amount of each transform to be used, and R is the size of the new image. So, each point on the original image at position r, $\Theta$ is transformed to the point $\rho$, $\phi$. The transformation ratio A is used to weight the straightness of lines transformation. Its compliment, 1−$\lambda$, is used to weight the direct view condition transformation.

The transformation leaves a new image on the screen with image elements at new positions represented by the equation above. Interpolation between pixels may be necessary because of the stretching and compressing caused by the transformation.

Figure 2:
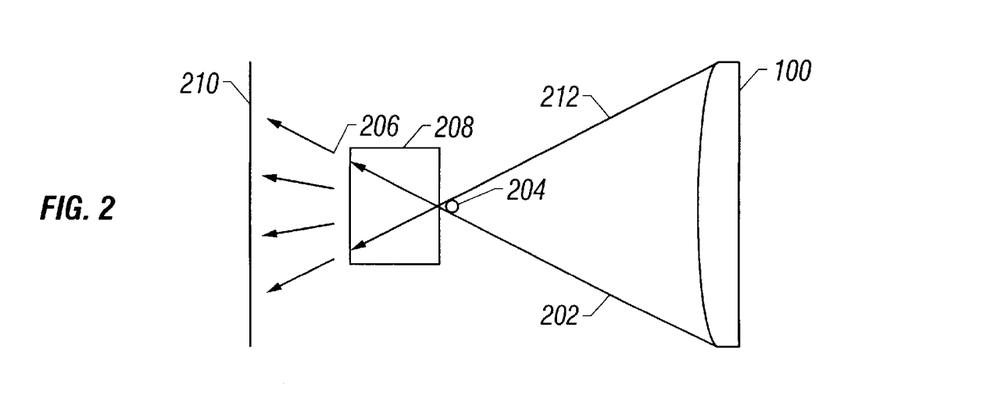
FIG. 2 shows a linear perspective transformation.

To explain this more conceptually, the linear perspective transformation is shown in FIG. 2. The rays of light 200 and 202 from object 100 are input through pinhole 204 to impinge on the rear photographic plate 206 of camera 208. The straightness of the lines can be preserved by mapping the image that is originally formed on surface 206 onto a new surface 210. This flat transformed surface effects a linear perspective transformation by the amount r/R.

Figure 3A:
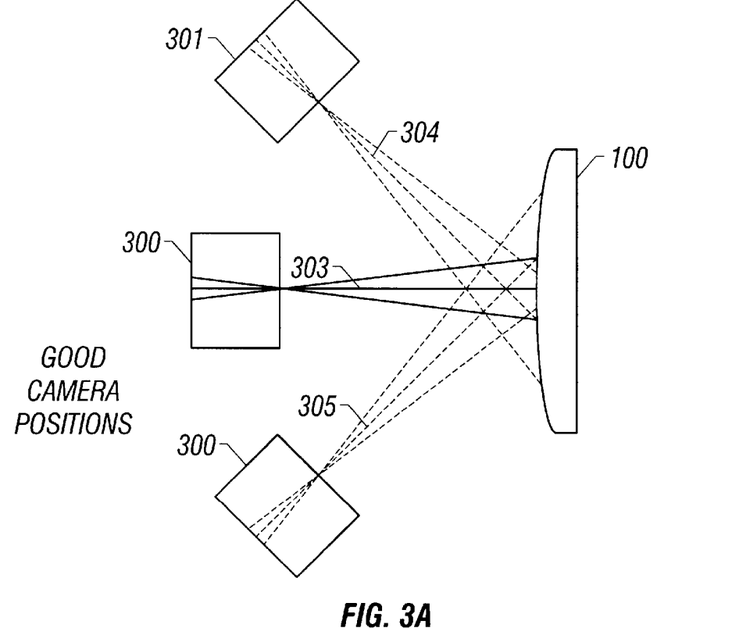
FIG. 3A shows how multiple flat-backed cameras can obtain a wide angle image of an object.
Figure 3B:
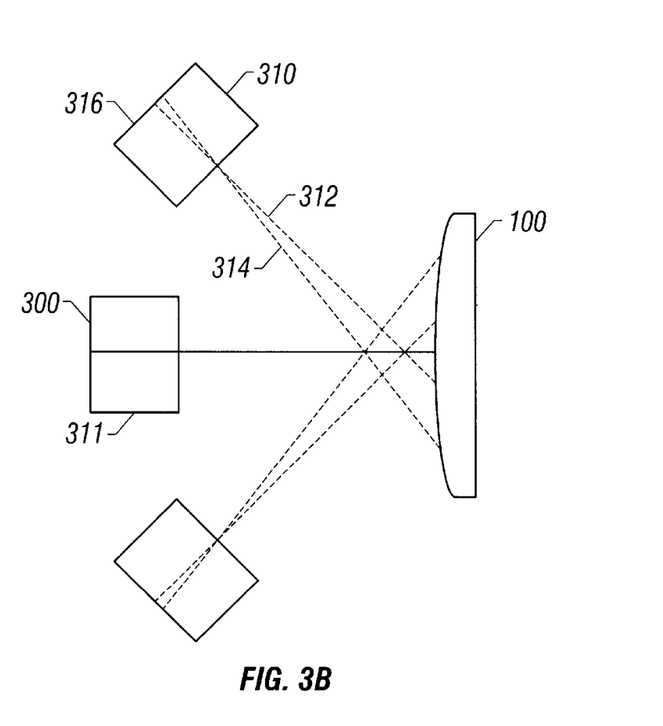
FIG. 3B shows how a single flat-backed camera cannot obtain that image.

Now, consider the situation of looking at an object 100 with a wide view as shown in FIG. 3A. Cameras 300, 301, and 302, all "look" directly at the object. The light rays 303, 304, and 305 arrive relatively straight. This situation assumes the hypothetical situation where all the cameras face the object 100, i.e., each faces in a different direction. FIG. 3B shows what would happen if all the cameras faced the same way. Camera 310 receives rays 312 and 314 which are skewed with respect to one another since the camera back 316 is parallel to the camera back 306 of camera 311. This would be the case for the usual camera which has a flat back—all imaging surfaces of the camera back are parallel. However, camera 310 is receiving rays from object 100 at an angle which distorts those rays.

Accordingly, the inventors found that in order to obtain an image which is undistorted in the direct view sense, each image point must appear to point directly towards the image. That is, the plurality of cameras which are effectively used to obtain the image in FIG. 3 must have what amounts to a spherical image obtaining surface.

Figure 4:
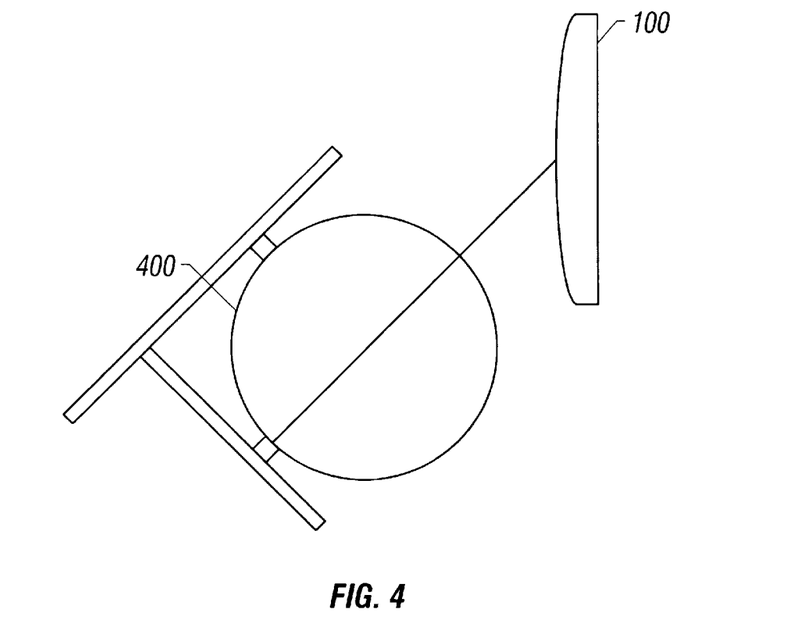
FIG. 4 shows a concept of a direct view transformation.

FIG. 4 shows the direct view transformation which preserves the shape and direction of objects. This essentially forms a projection of images 100, 150 to a spherical image obtaining surface 400 in a way such that each image object is directly viewed.

Figure 5:
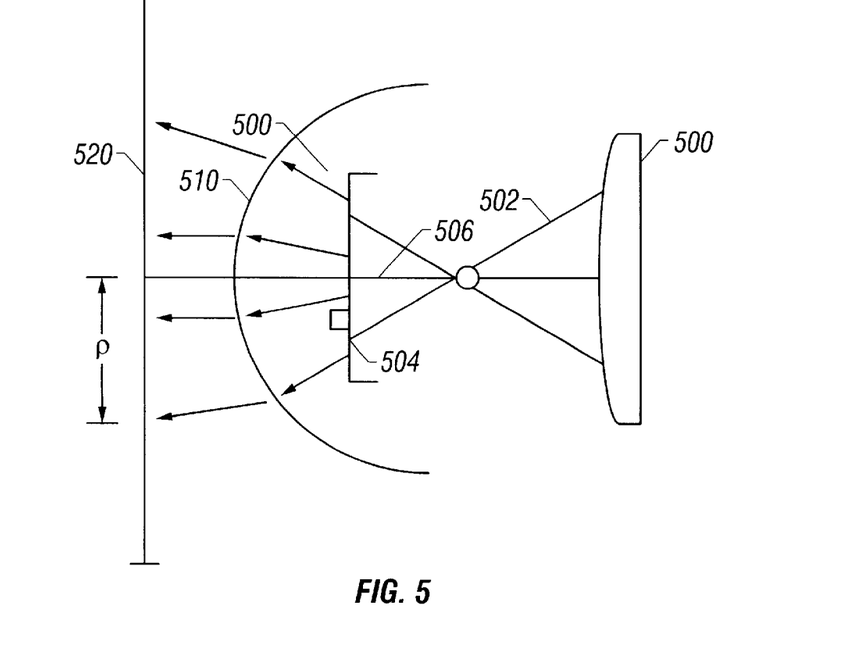
FIG. 5 shows the conceptual projection effected according to the present invention.

In the real world, however, cameras do not have spherical image receiving surfaces. Accordingly, the real world transformation used according to the present invention first obtains the image on a flat image receiving surface 500 as done by standard cameras. The image on the flat image receiving surface 500 is then mapped to sphere 510. The projection to the sphere 510 essentially maintains the direct view condition of the image. Now, the image on the sphere 510 needs to be mapped back to a flat surface which is done according to the present invention by projecting the image from the sphere 510 back to a flat surface 520.

The ray 502 then hits the initial image receiving surface 500 at point 504, which is located at a position r, $\Theta$ in polar coordinates. This point r, $\Theta$ is mapped onto the sphere 510, and then to the flat image receiving surface 520. The position of mapping onto the flat receiving surface 520 is referred to herein as $\rho$, $\phi$. Assuming the sphere is of radius 1, $$\rho(r) = \lambda \frac{r}{R} + (1-\lambda)\frac{r\left(\sqrt{r^2+1}-1\right)}{R\left(\sqrt{R^2+1}-1\right)}$$

Figure 6:
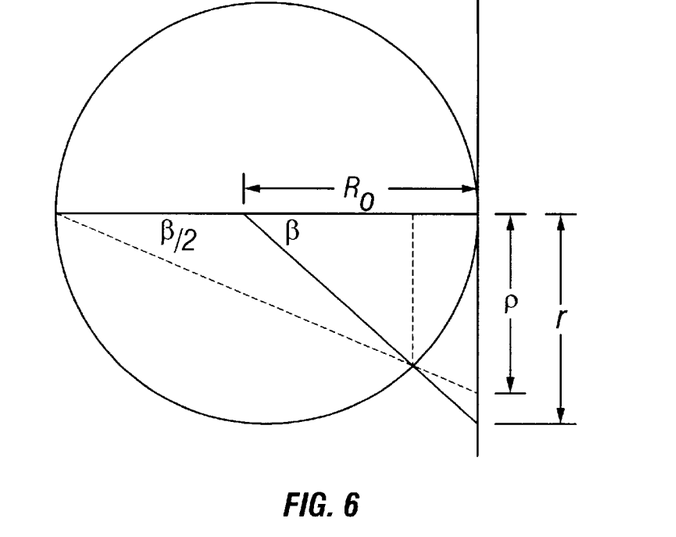
FIG. 6 shows the geometry of the transformation.

FIG. 6 shows the overall relationship. Calling the radius of the circle $R_0$, the original image on the photographic plate deriving from the object would be at the point r. The transformed image is at the point $\rho$. As seen from the diagram of FIG. 6, assuming $R_0 = 1$;

$$\zeta(r) = 2 \cdot \tan \beta/2$$

where $$\tan(\beta/2) = \frac{\sqrt{r^2+1}-1}{r}$$

As described above, $\lambda$ can either be constant, or variable. $\lambda$ may change depending on ($\rho$ and $\phi$ the viewing angle of the object). The preferred case balances between direct view compensation and zero curvature compensation to compensate for different directions of view at the object. For example, in the case of FIG. 3, views from the direction of camera 300 might be optimized for zero curvature conditions, but those views from cameras could be optimized for direct view.

For a lens-embodied system, the system would be optimized based on the position of the lens. For the operation described herein using electronic image processing, this can be done on a pixel-by-pixel basis.

Therefore, using the above information, $\lambda=1$ is a complete linear projection, while $\lambda=0$ is a projection which maintains the direct view transformation.

Another embodiment of the invention replaces the constant $\lambda$ by a function of r and $\Theta$ in polar coordinates to use $\lambda(r,\Theta)$ to allow different trade-offs between different types of distortion for different parts of the picture. When there are few long lines parallel to the edges of a wide angle picture, and a large number of objects of simple familiar shape, $\lambda$ should be small. An image with a lot of long straight edges would be better compensated if $\lambda$ is high.

Figure 7:
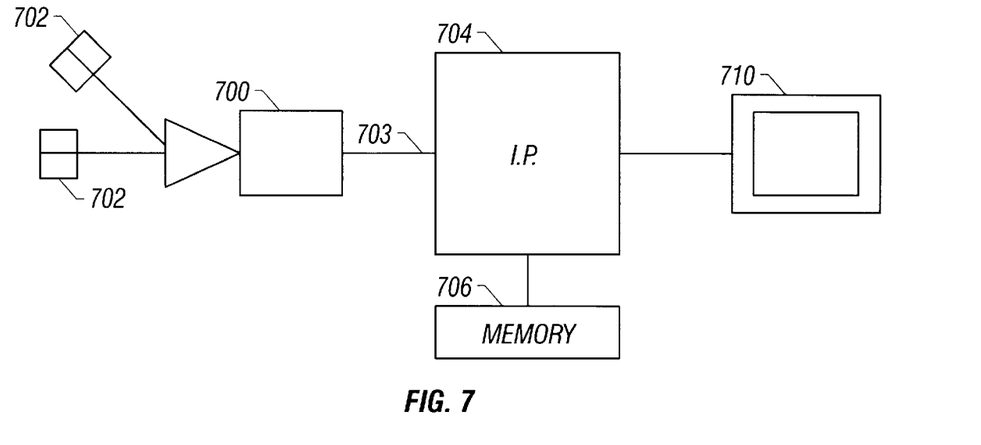
FIG. 7 shows an image processing system according to the present invention.

The first embodiment of the invention uses these techniques to provide a system which corrects distortion in images using the techniques described above. Camera 700 obtains a visual image of a scene 702. Camera 700 can be any camera which is capable of obtaining an image of a scene, including a photographic-type camera, an electronic camera or the like. The output is produced as 703 which is coupled to an image processing computer 704, with associated image memory 706, which processes the received information and displays it on output unit 710.

An alternate embodiment effects this by functionals. A functional F is an equation which returns a numerical indication of proper fit. Then minimization of these functionals allows determination of an error functional which is a numerical expression for the perceptual error for each type of distortion and simultaneously minimize these functionals.

$$K(\eta,\xi) = \max_{x,y} R_0^2 \frac{|\eta_{xx}|^2 + |\eta_{yy}|^2 + 2|\eta_{xy}|^2 + |\xi_{xx}|^2 + 2|\xi_{xy}|^2}{\frac{1}{4}((A+C) - \sqrt{((A-C)^2 + 4B^2)})^2}$$

If we set $K(T_{plane}, x,y)=0$, we can see that all the second derivatives of $\eta$ and $\xi$ should be equal to zero, therefore, $T_{plane}$ should be a linear transformation. This coincides with the fundamental theorem of affine geometry which says that the only transformations of the plane which map lines into lines are linear transformations.

Direct view error function. In order to formalize the direct view condition we consider mappings which are locally equivalent to direct projection as defined in Section 3. We can observe that the projection onto the sphere is locally a direct projection. Therefore, if we use the decomposition $P=T_{sphere} \circ \Pi_{sphere}$ we have to construct the mapping $T_{sphere}$ which is locally is as close to a similarity mapping as possible. Formally, it means that the differential of the mapping $T_{sphere}$, which maps the tangent plane of the sphere at each point x to the plane $T_{f(x)}R^2=R^2$ coinciding with the picture plane vat the point $f(x)$, should be close to a similarity mapping. The differential $DT_{f(x)}$ can be represented by the Jacobian matrix J of the mapping $T_{sphere}$ at the point x. A nondegenerate linear transformation J is a similarity transformation if and only if $|Jw|/|w|$ doesn't depend on w.

If this ratio depends on w, then we define the direct view error function to be $$D(T_{sphere}, \theta, \zeta) = \left|\max(|Jw|^2) \bigg/ \min\left(\frac{|Jw|^2}{|w|^2}\right) - 1\right|$$

can be used as the measure of "non-directness" of the transformation at the point 9for more detailed discussion see [Aur95].)

It can be shown that $$D(\eta,\xi) = \max_{x,y} R_0^2 \frac{(E+G) - \sqrt{(E-G)^2 + 4F^2}}{(E+G) + \sqrt{(E-G)^2 + 4F^2}} - 1$$

where $E=(\eta_u)^2+(\xi_u)^2$, $F+\eta_u\eta_v+\xi_u\xi_v$, $G=\eta_v^2+\xi_v^2$.

Additional constraints can be imposed on the acceptable transformation. For example, it is possible to design transformations that preserve vertical and/or horizontal straight lines in an image. The analytical form of these transformations can be different from DP (r) or any other expression in the patent, or might be exist (some transformations can be computed only numerically.)

In particular, it is feasible to make corrective transformations only in one coordinate, preserving the other. If the horizontal coordinate is preserved, vertical lines remain vertical.

The image altering device of the present invention can be any kind of image changing element including a lens, a microprocessor or DSP based image processor, or an analog image processor. The digital image processor device operates as follows The image processor operates according to the flowchart of FIG. 8. At step 800, the image is acquired. The image can be acquired by any known technique, but is preferably acquired using either a photographic camera with a photographic plate or an electronic camera such as a video camera or CCD device. The information must be converted into a form where it can be processed. The preferred embodiment of this invention converts the image into an electrical signal 702. Electrical signal 702 is coupled to image processor 704, which determines the content and kind of distortions in the picture at step 802. This can be done in many ways. One simple way of doing this is to manually observe the image relative to the original, and manually ascertain the kind and quality of distortions therein.

Figure 8:
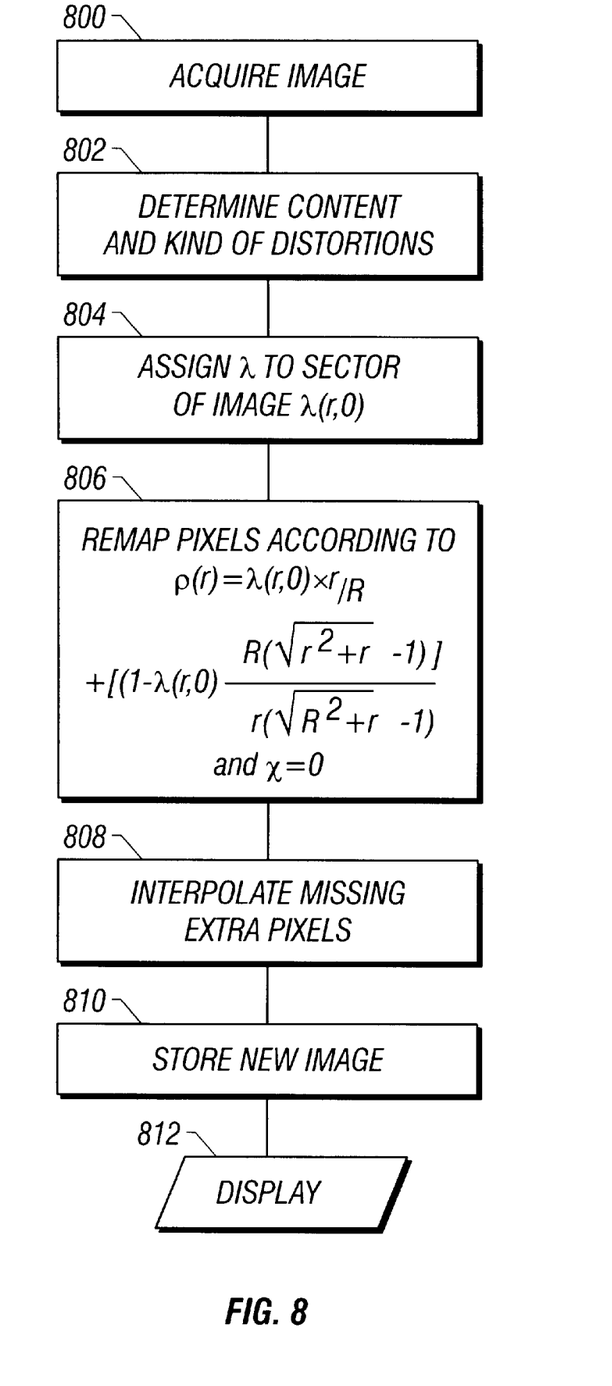
FIG. 8 shows a flowchart used by the image processing system of the present invention.

This can also be done automatically using software which is appropriately programmed to determine the amount and kind of lines and spheres in the image. Different parts of the image may include different kinds of distortions.

At step 804, the different distortions in the different parts of the images are correlated against the correction value. As discussed above, this system corrects these distortions using a higher value of $\lambda$ for linear perspective distortion so that the linear perspective distortion can be expressed according to the equations above, with $\lambda(r,\Theta)$. A smaller value of $\lambda$ makes the correction closer to the second half of the equation thus better preserving the shape of the objects. Based on this analysis, a parameter $\lambda$ is assigned as a function of R and $\Theta$. $\lambda$ can be constant for areas of said image, or can be a continuously varying function.

Figure 8A:
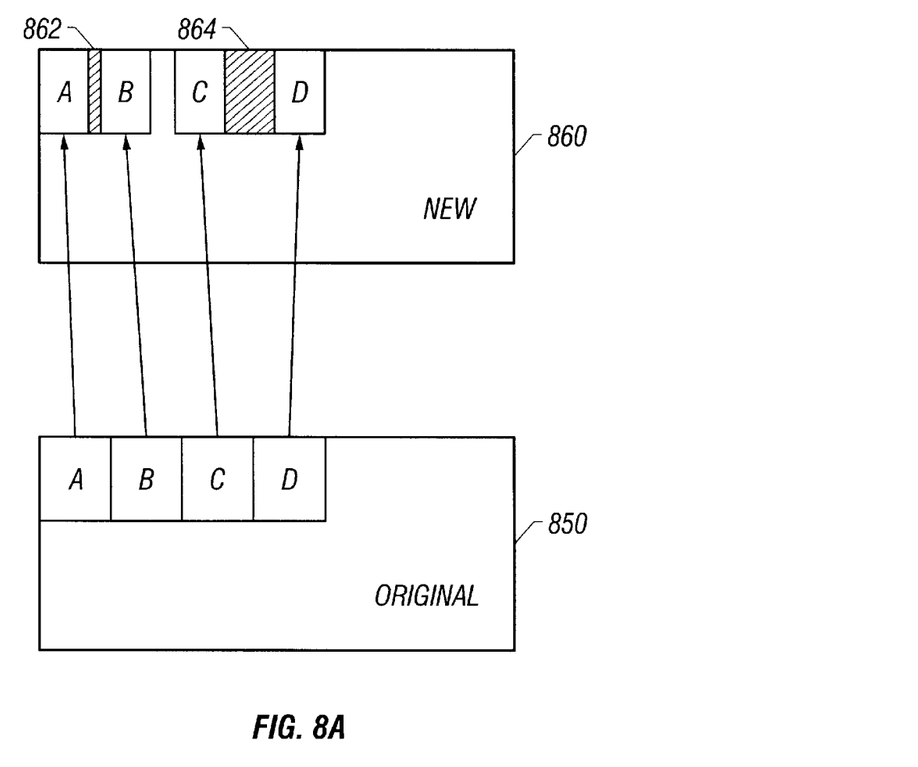
FIG. 8A shows how the images are re-mapped according to the present invention.

At step 806 the pixels are remapped according to $\rho,\Theta$. Examples of this mapping operation are shown in FIG. 8A. The original image 850 is shown with pixel areas A, B, C and D; each of which can be single pixels or blocks of pixels. The mapping operation is shown in FIG. 8A where each of the pixel areas from (r, $\Theta$) are mapped to locations ($\rho$, $\psi$) to form the new corrected image 860.

Pixels A and B are mapped in the new image closer to one another than they were in the original image. The pixels include a hatched overlap area 862 therebetween. This means that extra pixels are formed between the pixel areas A and B. These extra pixels are interpolated at step 808. The area 862 is interpolated using the combination of the pixels from A and B which form the overlap area. Such interpolation is well known in the art.

The pixels C and D show precisely the opposite situation. The pixels C and D in the new image are further spaced from one another than they were in the original image. This space area 864 is interpolated at step 808 to provide appropriate missing pixels between the pixels C and D.

Both of these operations can be analogized to images on putty which are being stretched or compressed. The AB to AB transformation corresponds to compression of the image on the putty. The CD to CD information corresponds to a stretching on that same hypothetical image.

Once the missing and extra pixels have been interpolated at step 808, the new image is stored at step 810. The storage of the new image is preferably in an image type memory, but can also be effected through a charge coupled device array or on a photographic plate or on a photosensitive surface such as a drum of a copying machine or laser printer.

Step 812 shows "display" of the image which generically refers to herein as displaying it on a screen, on a photographic plate or paper or on a printer. The new image which is displayed at step 812 has corrected for the content and kind of distortions therein by the techniques described above.

Figure 7A:
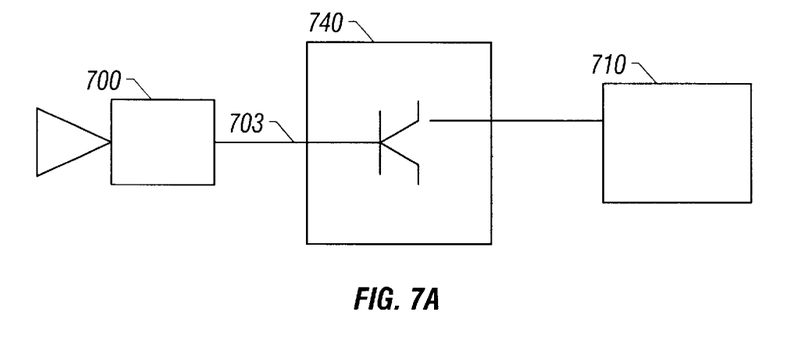
FIG. 7A shows an analog image processing system.

The system can also be carried out as shown in FIG. 7A. There, the camera output 703 is coupled to analog circuit 740 which has circuitry to calculate the function (1) or (2) above. For example, circuit 740 can be effected in components (e.g. transistors, capacitors, resistors, etc.) or in analog VISI.

Figure 9:
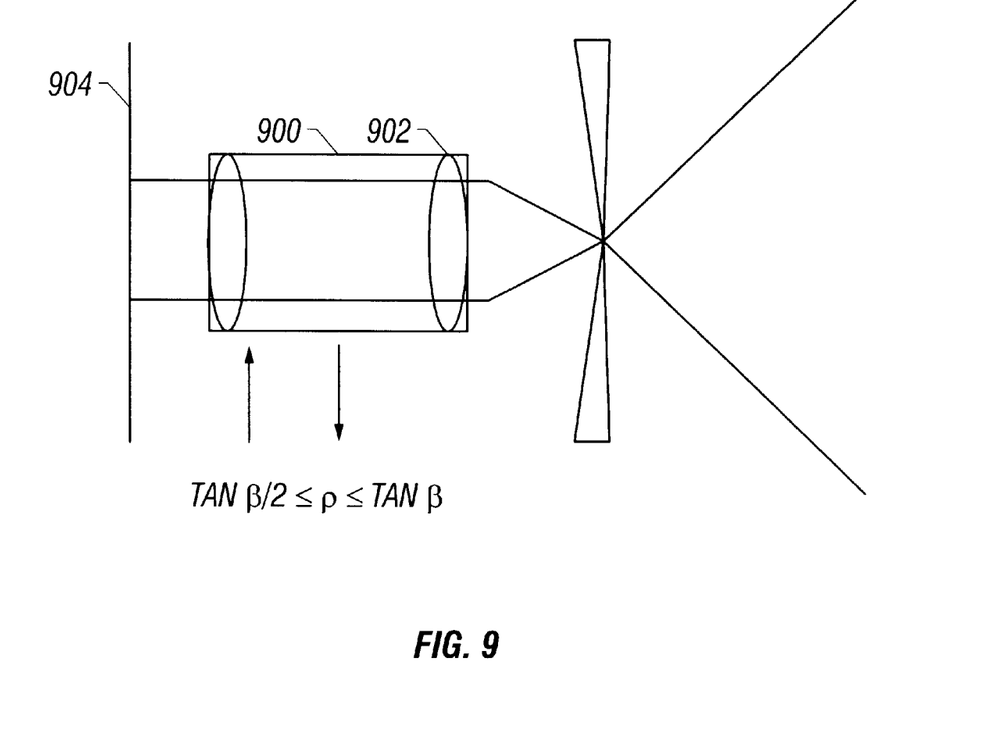
FIG. 9 shows a first lens embodiment of the present invention.
Figure 10:
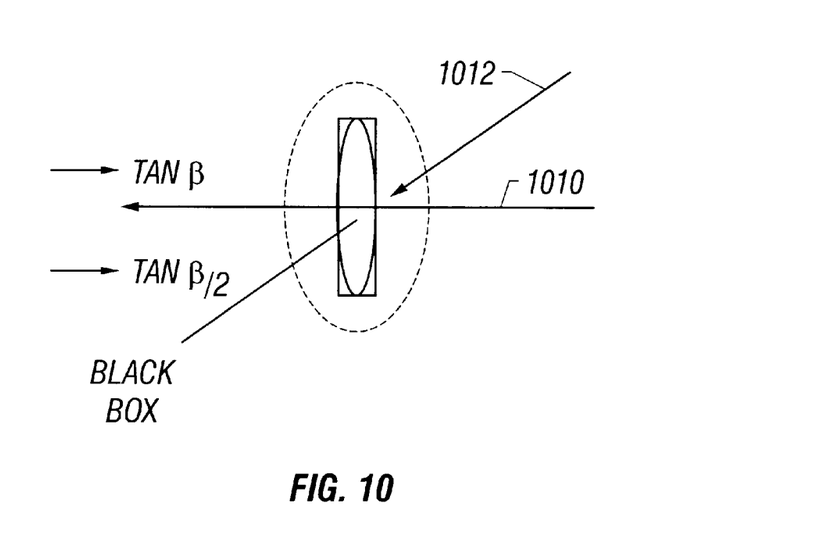
FIG. 10 shows a second lens embodiment according to the present invention.

An alternate embodiment of the present invention is shown in FIGS. 9 and 10 which show a lens system constructed according to the teachings of the present invention. FIG. 9 shows the lens effected by a barrel lens device 900 including lens elements 902 and 904. More generally, however, any number of lens elements could be used. Parameters of lenses in the barrel 902 and 904 are variable with respect to one another. Those having ordinary skill in the lens forming art well understand how to alter lens characteristics to make a lens system having any desired transfer function. The lens system in FIG. 9 is variable such that the overall output of the lens varies between tangent β and tangent of β/2, where β is the input ray direction and as defined above. The field of view of the lens can also be changed as in a "zoom" lens. The alternate embodiment shown in FIG. 10 provides a lens which has different kinds of transfer characteristics for different impinging rays. The ray 1010 has a transfer characteristic of tangent β. The ray 1012 has a transfer characteristic of tangent β/2. More generally, this lens provides different transfer characteristics between tangent p and tangent β/2 for incoming rays coming from different directions.

The simplest single lens system is shown in FIG. 11. In this figure, the incoming rays are transformed with a transfer characteristic which is between but not equal to, either of tangent β or tangent β/2. More generally, this lens has a transfer characteristic of tangent β/k, where k is greater than or equal to 1 and less than or equal to 2.

An alternate embodiment uses an additional constraint which preserves vertical straight lines, under this additional limitation, the following transformation can be shown to satisfy direct view condition:

where x,y are coordinates in the original image and η, ξ are coordinates in the new image and w is the width of the $$\eta(x, y) = \frac{\tan^{-1}(x)}{\tan^{-1}(W)}$$

$$\xi(x, y) = \left( \ln \frac{y + \sqrt{x^2 + y^2 + 1}}{\sqrt{x^2 + 1}} \right) \frac{1}{\tan^{-1} W}$$

image. We assume x to be the horizontal coordinate and y to be the vertical coordinate.

This transformation can be used instead of the direct view projection in all the constructions given above. The parametric family of transformations linearly interpolating between linear perspective projection and the projection above can be written as $$\xi(x, y) = (1 - \lambda) \frac{y}{W} + \lambda \frac{1}{\tan^{-1}(W)} \ln \frac{y + \sqrt{x^2 + y^2 + 1}}{\sqrt{x^2 + 1}}$$

If we exchange x and y and η and ξ in the form above, the resulting transformation will preserve horizontal straight lines instead of vertical.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of correcting an image, comprising:
   obtaining an image in a form where image components can be moved to different locations in the image;
   obtaining first and second transformation parameters for the image, said first transformation parameter being a transformation for preserving straightness of lines, and said second transformation parameter being a transformation minimizing distortion of shapes; and
   correcting said image by moving its components to different locations, said correcting of at least one of said components being based on both said first transformation parameter and said second transformation parameter.

2. A system for processing images, comprising:
   a first element which receives a signal indicative of a content of an image;
   a memory, operating to store the content of the image;
   an image processor, investigating the image content in said memory to determine kinds of information in the image, and to obtain first and second transformation parameters for the image, said first transformation parameter correcting for a first straightness of lines distortion in the image, and said second transformation parameter correcting for a second distortion of shape distortion in the image and to correct said image by moving its components to different locations based on both said first transformation parameter and said second transformation parameter at the same time, in addition to a transformation ratio that sets a ratio between said first and second transformation parameters.

3. A method of correcting an image, comprising:
   obtaining an image in a form where image components can be moved to different locations in the image;

obtaining first and second transformation parameters for the image, said first transformation parameter being a transformation for preserving straightness of lines, and said second transformation parameter being a transformation minimizing distortion of shapes; and correcting said image by moving its components to different locations, said correcting of at least one of said components being based on both said first transformation parameter and said second transformation parameter, wherein said first transformation corrects as $\rho = r/R$, where r is the polar coordinate of an initial image, and R is a dimension of the photographic plate, and said second transformation corrects as $$\rho = \frac{R\left(\sqrt{r^2+1}-1\right)}{r\left(\sqrt{R^2+1}-1\right)}$$

where $\rho$ and $\phi$ are transformed polar coordinates corresponding to original polar coordinates r and $\varnothing$, $\lambda$ is a transformation ratio defining the amount of each transform to be used, and R is the size of an image; and said first and second transformation are combined as $$\rho(r) = \lambda\frac{r}{R} + (1-\lambda)\frac{R\left(\sqrt{r^2+1}-1\right)}{r\left(\sqrt{R^2+1}-1\right)}.$$

4. A method of correcting an image, comprising:
obtaining an image in a form where image components can be moved to different locations in the image;
obtaining first and second transformation parameters for the image, said first transformation parameter being a transformation for preserving straightness of lines, and said second transformation parameter being a transformation minimizing distortion of shapes; and
correcting said image by moving its components to different locations, said correcting of at least one of said components being based on both said first transformation parameter and said second transformation parameter, further comprising:
  determining a first part of the image;
  determining kinds of distortion in said first part of said image, and a first transformation ratio between said straightness of lines transformation and said distortions of shape transformation which will appropriately correct for said distortion in said first part of said image;
  determining a second part of said image;
  determining kinds of distortion in said second part of said image, and a second transformation ratio, different than said first transformation ratio, between said straightness of lines transformation and said distortions of shape transformation which will appropriately correct for said distortion in said second part of said image; and
  correcting distortion in said first part of said image using said first transformation ratio and correcting distortion in said second part of said image using said second part of said image using said second transformation ratio.

5. A method as in claim 3 wherein said transformation ratio $\lambda$ is a function of coordinates of the image.

6. A method as in claim 4 wherein said obtaining an image obtains an image on a photographic plate.

7. A method as in claim 4 wherein said obtaining an image comprises obtaining an electronic view of the image.

8. A method of obtaining a distortion-free image, comprising:
obtaining a two-dimensional image of a three dimensional object as projected onto a flat image plane;
first carrying out an operation which has the effect of converting said image from said first flat image plane into an image projected onto a second, curved image plane; and
second carrying out an operation which has the effect of transforming said image from said second image plane to a third, flat image plane, wherein said projections are carried out such that $$\rho(r) = \lambda\frac{r}{R} + (1-\lambda)\frac{R\left(\sqrt{r^2+1}-1\right)}{r\left(\sqrt{R^2+1}-1\right)}$$

and $\phi = \varnothing$ where $\rho$ and $\phi$ are transformed polar coordinates corresponding to the original polar coordinates r and $\varnothing$, $\lambda$ is a transformation ratio defining the amount of each transform to be used, and R is the size of the image.

9. A method of correcting an image, comprising:
acquiring an image that has distortion therein;
determining kinds of distortions which exist in different parts of the image, and classifying said distortions based on whether they will be more easily corrected by a linear transformation or by a direct view transformation;
setting a first transformation ratio $\lambda 1$ for a first area of the image;
setting a second transformation ratio $\mu 2$ for a second area of the image;
correcting each said area of the image using a combination of said linear transformation and direct view transformation as weighted by said first and second transformation ratio respectively and a compliment of said transformation ratio respectively, wherein said correcting is carried out such that $$\rho(r) = \lambda\frac{r}{R} + (1-\lambda)\frac{R\left(\sqrt{r^2+1}-1\right)}{r\left(\sqrt{R^2+1}-1\right)}$$

and $\phi = \varnothing$, where $\rho$ and $\phi$ are the transformed polar coordinates corresponding to the original polar coordinates r and $\varnothing$, $\lambda$ is the transformation ratio defining the amount of each transform to be used with $\lambda 1$ being used for said first area, and $\lambda 2$ being used for said second area, and R is the size of the new image.

10. A method as in claim 8 where $\lambda$ is a function of coordinates of the image on the screen.

11. A method as in claim 8 wherein said first and second transformations are carried out by a computer which computes new pixel locations for pixels of the image.

12. A method as in claim 8 wherein said transformations are carried out by a lens.

13. A method of correcting an image, comprising:

acquiring an image that has distortion therein;

determining kinds of distortions which exist in different parts of the image, and classifying said distortions based on whether they will be more easily corrected by a linear transformation or by a direct view transformation; setting a first transformation ratio $\lambda 1$ for a first area of the image;

setting a second transformation ratio $\lambda 2$ for a second area of the image;

correcting each said area of the image using a combination of said linear transformation and direct view transformation as weighted by said first and second transformation ratio respectively and a compliment of said transformation ratio respectively.

14. A method of correcting distortion in images, comprising:

obtaining a two dimensional image of a three dimensional object; and transforming said two dimensional image in a way to reduce distortion therein, using a transformation ratio which is greater than zero, and less than one, to balance linear transformation and direct view transformations and to use both linear transformation and direct view transformations at the same time, wherein said transformation ratio is different for different parts of the image.

15. A method as in claim 14 wherein said transformation ratio is different for different parts of the image.

16. A method as in claim 14 wherein said transformation ratio is a function of position in the image.

17. A method as in claim 13 wherein said transformation causes some of the areas of the transformed image to be closer together than the original, and causes some areas of the transformed image to be further apart than the original, and further comprising interpolating pixels to form a new image with constant pixel density.

* * * * *